Figure 1:
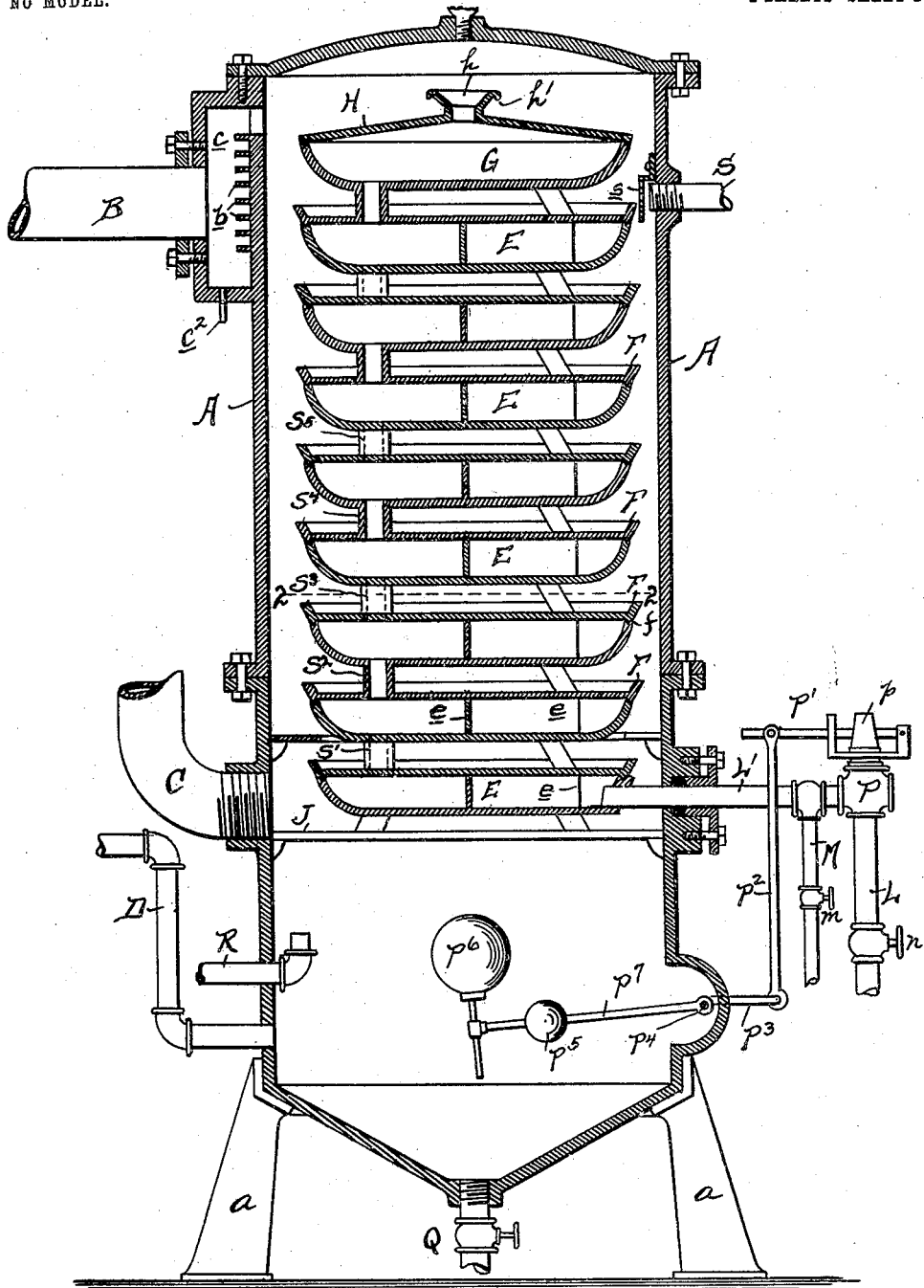

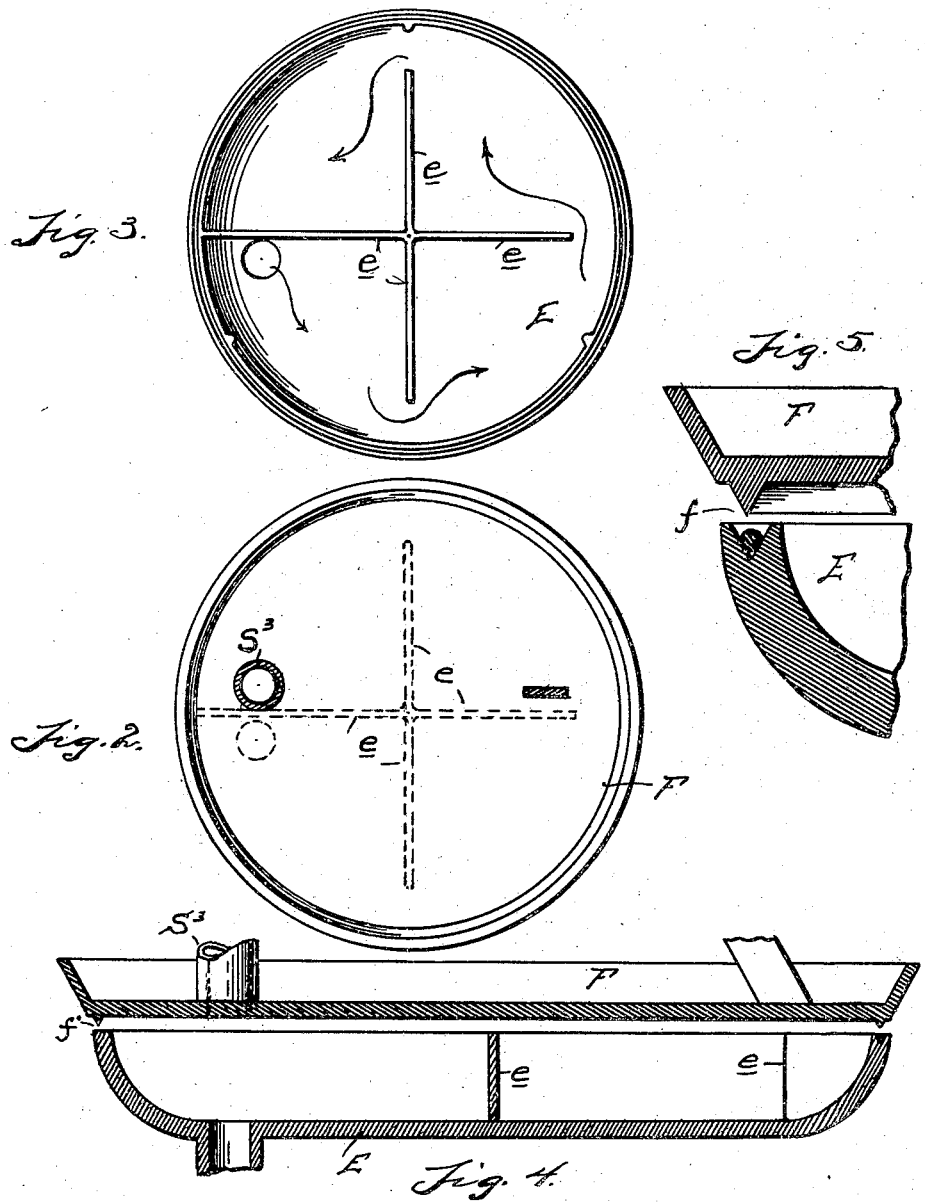

No. 769,000. Patented August 30, 1904.

UNITED STATES PATENT OFFICE.

JOHN H. KINGSLEY, OF MANCHESTER, MICHIGAN.

FEED-WATER HEATER AND PURIFIER.

SPECIFICATION forming part of Letters Patent No. 769,000, dated August 30, 1904.

Application filed September 22, 1902. Serial No. 124,283. (No model.)

*To all whom it may concern:*

Be it known that I, JOHN H. KINGSLEY, a citizen of the United States, residing at Manchester, county of Washtenaw, State of Michigan, have invented a certain new and useful Improvement in Feed-Water Heaters and Purifiers; and I declare the following to be a full, clear, and exact description of the invention, such as will enable others skilled in the art to which it pertains to make and use the same, reference being had to the accompanying drawings, which form a part of this specification.

My invention relates to feed-water heaters; and it consists in the improvements hereinafter described, and pointed out in the claims.

Referring to the accompanying drawings, Figure 1 is a sectional elevation of a feed-water heater embodying my invention. Fig. 2 is a horizontal section on the line 2 2 of Fig. 1, the cover of the pan being removed. Fig. 3 is a plan view of one of the pans shown in Fig. 1, the cover being removed. Fig. 4 is an enlarged sectional view of one of the pans with the cover lifted. Fig. 5 is an enlarged sectional detail of a part of one of the pans and covers.

A A represent a cylindrical casing mounted upon legs $a$ $a$.

B is a pipe through which the exhaust-steam from the engine is carried into the casing A. The pipe B opens into an auxiliary chamber $c$, which chamber communicates with the interior of the casing A.

$b$ represents ribs or projections from the wall of the chamber $c$ opposite the inlet of the pipe B. The office of said ribs is to separate the oil or other impurities from the inflowing steam. The fluids thrown down in the chamber $c$ may be conducted away by the drip-pipe $c^2$.

C is an eduction-pipe by which any steam not condensed in the casing A may be discharged.

D is a pipe leading to the feed-pump by which water to be fed to the boiler is withdrawn from the lower part of the casing A.

E E E E are pans supported in the casing A, substantially concentric therewith, upon cross-bars J.

$e$ represents vertical partitions set at intervals in the interior of the pans E. All but one of the partitions $e$ in each of the pans E has an interval between its end, which makes a contracted passage for the water flowing through the pan.

F F F F are covers for the pans E, provided on their lower sides at their edges with annular projections adapted to extend into annular grooves in the upper edges of the pan E to form substantially tight joints $f$. The upper parts of the covers F are formed to constitute shallow pans. G is the upper pan. Each of the covers F is connected in the pan above it by a tube $S'$ $S^2$ $S^3$ $S^4$, which tubes when the covers are in place form passages between the pans E E E E and G.

L L' represent the inlet-pipe for the feed-water. The portion L' extends through the wall of the casing A and communicates with the lower pan E. The tube $S'$, which forms the communication from the lower pan E and the one next above, opens into the higher pan close to the imperforate partition $e$. The tube $S^2$ leads out of the lower pan at the other side of said imperforate partition, and the tubes $S^2$, $S^3$, and $S^4$ have this same relative arrangement with relation to each other. Thus the water entering the feed-pipe L L' passes around the pan E, out through the pipe $S'$, then nearly around the latter pan, and rises through the pipe $S^2$, and in this same way the water passes through the various pans, the aperture $e$ serving to prevent currents of different temperatures in the water. The pan G is provided with a conical cover H, smooth on its upper surface and having an exit through the inverted cone $h$ at its center and highest point. The outer upper edge of the cone $h$ is provided with a depending annular ridge $h'$.

The feed-water enters through the pipe L L', passes through the pans E, as above described, through the tube $S^4$ to the pan G, from which it flows through the cone $h$ upon the surface of the cover H, down which it flows, spreading out as it approaches the periphery, and drips from the edge in a thin sheet into the pan formed by the upper cover F, and from thence it falls successively into the other similar pans and into the lower portion of the casing A, from whence it is withdrawn for feeding the boilers. The exhaust-steam enters the casing from the pipe B, coming in contact with the feed-water on the cover H and in the pans of the various covers F and when it is dripping from one to the other. The steam passes from the upper part of the casing A through the opening to the lower part of said casing and passes to the eduction-pipe C.

R is an overflow-pipe, and Q is a pipe by which the water may be withdrawn from the casing A.

P is a valve in the inlet-pipe L L'. The valve P is adapted to be opened or closed by raising or lowering the lever P', which acts upon the valve-stem $p$.

$P^4$ is a rock-shaft extending into the casing A.

$P^7$ is a lever secured to the rock-shaft $P^4$ inside of the casing A.

$P^3$ is a lever secured to the rock-shaft $P^4$ outside the casing A.

$P^2$ is a connecting-rod between the levers $P^3$ and P'.

$P^5$ is a weight adapted to slide along the lever $P^7$ to balance the weights acting downward upon the lever $P^3$.

$P^6$ is an adjustable float upon the end of the lever $P^7$.

When the water rises in the casing A, it acts to raise the float $P^6$, lowering the lever P' and closing the valve P, so as to stop the influx of the water through the pipe L L'. When the water-level falls in the casing A, the lever P' is raised, opening the valve P and allowing the water to run again.

$n$ is a valve by which the pipe L may be closed.

M is a pipe communicating with the pipe L' upon the side of the valve P toward the casing A.

$m$ is a valve in the pipe M. By closing the valve $n$ and opening the valve $m$ the water may be withdrawn from the pans E and G, and by alternately admitting water to said pans by means of the valve $n$ and drawing it out through the pipe M said pans may be washed to clean them of sediment.

In the interior of the pans E are formed crossed partitions $e$, Fig. 4, one arm of one of said partitions extending completely to the wall of the pan, the other arms of said partition leaving space between their ends and the walls of the pan, as shown in Fig. 3.

S is the terminal of the pipes forming the heating system of the building.

$s$ is a plate extending in front of the opening to the pipe S and acting to deflect the entering steam from said opening.

What I claim is—

1. In a feed-water heater, the combination of a casing, a series of superimposed inclosed pans therein, a series of superimposed open pans in said casing and means for feeding the water consecutively through said inclosed and open pans.

2. In a feed-water heater, the combination of a casing, a series of superimposed inclosed pans therein, a series of pans open to the interior of the casing severally above the several inclosed pans, and means for feeding the water consecutively through the inclosed and open pans.

3. In a feed-water heater, the combination of a casing, a series of superimposed inclosed pans therein, said pans communicating with each other, and means for feeding the water to a lower pan, and out into the casing at an upper pan.

4. In a feed-water heater, the combination of a casing, a series of superimposed inclosed pans therein, a series of pans open to the interior of the casing severally above the several inclosed pans, and means for feeding the water to a lower inclosed pan through the series of inclosed pans and into an upper open pan, the open pans being so arranged that the water shall flow by gravity from one to the other.

5. In a feed-water heater, the combination of a casing, a series of superimposed pans in said casing, each of said pans being provided with a removable cover forming a pan open to the interior of the casing, said inclosed pans communicating with each other, means for feeding the water to a lower inclosed pan, and a passage for the water from an upper inclosed pan adapted to discharge the water into an upper open pan.

6. In a feed-water heater, the combination of a casing, means for supplying steam to said casing, an inclosed pan in said casing, the upper wall of said pan being exposed to the steam of said casing, said pan being provided with an opening toward the center of its upper wall, and means for feeding water into said pan.

7. In a feed-water heater, the combination of a casing, an inclosed pan therein, a conical cover to said pan, an inverted cone having a depending annular flange at its upper periphery at the center of said cover and means for admitting water to said pan, and discharging it through said inverted cone.

In testimony whereof I sign this specification in the presence of two witnesses.

JOHN H. KINGSLEY.

Witnesses:
C. W. CASE,
F. M. FREEMAN.